United States Patent [19]

Saito

[11] Patent Number: 5,251,040
[45] Date of Patent: Oct. 5, 1993

[54] IMAGE COMMUNICATION APPARATUS HAVING INK JET RECORDER WITH TIMER FOR CONTROLLING RECEPTION OF SUCCESSIVE PAGES OF IMAGE DATA

[75] Inventor: Atsushi Saito, Yokohama, Japan
[73] Assignee: Canon Kabushiki Kaisha, Tokyo, Japan
[21] Appl. No.: 949,357
[22] Filed: Sep. 23, 1992

Related U.S. Application Data

[63] Continuation of Ser. No. 658,390, Feb. 20, 1991, abandoned.

[30] Foreign Application Priority Data

Feb. 23, 1990 [JP] Japan .................. 2-41060

[51] Int. Cl.⁵ .................. H04N 1/21; H04N 1/32; G01D 15/16
[52] U.S. Cl. .................. 358/296; 358/434; 358/435; 346/134
[58] Field of Search .................. 358/296, 434, 435, 438, 358/439; 346/25, 134

[56] References Cited

U.S. PATENT DOCUMENTS

| | | | |
|---|---|---|---|
| 4,313,124 | 1/1982 | Hara | 346/140 R |
| 4,333,088 | 6/1982 | Diggins | 346/140 R |
| 4,345,262 | 8/1982 | Shirato et al. | 346/140 R |
| 4,376,283 | 3/1983 | Bower | 346/140 R |
| 4,459,600 | 7/1984 | Sato et al. | 346/140 R |
| 4,463,359 | 7/1984 | Ayata et al. | 346/1.1 |
| 4,519,081 | 5/1985 | Sugie | 371/57 |
| 4,558,333 | 12/1985 | Sugitani et al. | 346/140 R |
| 4,723,129 | 2/1988 | Endo et al. | 346/1.1 |
| 4,728,963 | 3/1988 | Rasmussen et al. | 346/25 |
| 4,740,796 | 4/1988 | Endo et al. | 346/1.1 |
| 4,841,373 | 6/1989 | Asami et al. | 358/434 X |
| 4,933,772 | 6/1990 | Ikenoue et al. | 358/434 X |
| 4,972,270 | 11/1990 | Kurtin et al. | 358/296 |
| 4,999,716 | 3/1991 | Nakamura | 358/434 |

FOREIGN PATENT DOCUMENTS

| | | |
|---|---|---|
| 59-123670 | 7/1984 | Japan . |
| 59-138461 | 8/1984 | Japan . |
| 59-158172 | 9/1984 | Japan . |
| 59-178868 | 10/1984 | Japan . |
| 2-029360 | 1/1990 | Japan . |

Primary Examiner—Mark J. Reinhart
Assistant Examiner—Eric Frahm
Attorney, Agent, or Firm—Fitzpatrick, Cella, Harper & Scinto

[57] ABSTRACT

An image communication apparatus for recording received image using a recording head capable of ejecting ink from orifices by utilizing energy generated from ejection energy generating elements includes a communication unit for receiving procedure signals concerning communication and image data, a driving control unit for controlling the driving of the recording head according to image data received by the communication unit, a timer unit for measuring a predetermined period of time according to the end of processing of a predetermined quantity of received image data, and a communication control unit for controlling the sending to the transmitting side of a signal for enabling reception of next image data according to the count of the timer unit.

6 Claims, 5 Drawing Sheets

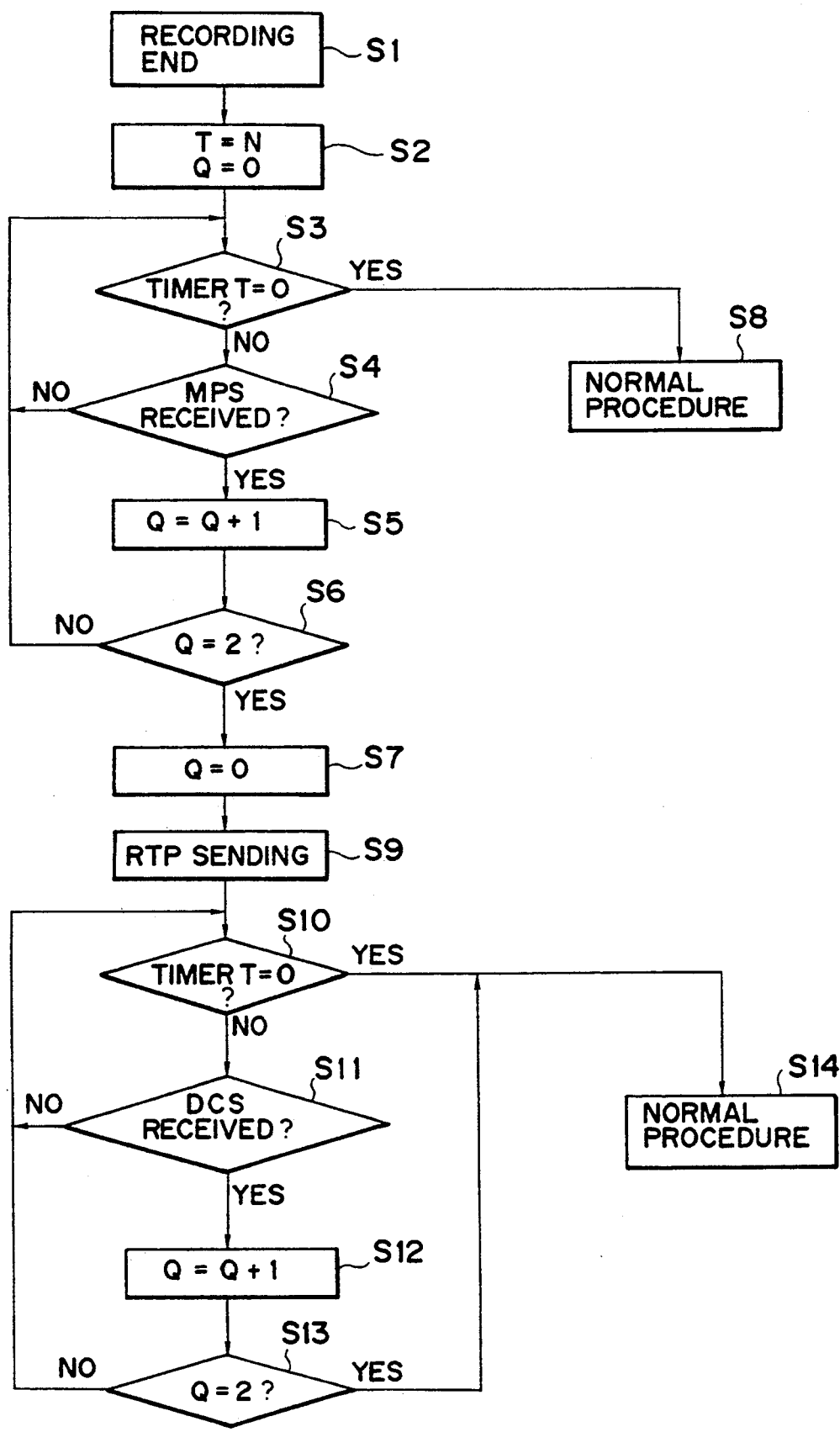

IMAGE COMMUNICATION APPARATUS HAVING INK JET RECORDER WITH TIMER FOR CONTROLLING RECEPTION OF SUCCESSIVE PAGES OF IMAGE DATA

This application is a continuation of application Ser. No. 07/658,390 filed Feb. 20, 1991, now abandoned.

BACKGROUND OF THE INVENTION

1. Field of the Invention

This invention relates to an image communication apparatus such as a facsimile apparatus and, more particularly, to an image communication apparatus provided with an ink jet printer having a plurality of ink ejection orifices.

2. Related Background Art

Recently, ink jet printers have been developed which perform recording of characters and images with ink ejected from orifices onto a recording medium by using bubbles generated by heat energy. In such printers, heat-generating resistors (or heaters) are provided inside the individual orifices. These resistors are far smaller in size compared to piezoelectric elements used for conventional ink jet printers. Thus, it is possible to arrange orifices in a high density multiplex array, thus permitting a high quality recorded image to be obtained as well as permitting operation speed to increase and reducing noise.

Meanwhile, facsimile apparatus is required to be capable of not only high speed transmission of image but also high speed reception of image of a high quality. An ink jet printer which has the above features is thought to meet these demands.

In this type of ink jet printer, it is the practice to take measures for preventing ink ejected onto and fixed on recording paper from being transferred onto the next recording paper when the next recording paper is overlapped over the first-mentioned recording paper. Such measure requires a time (i.e., a fixing time) of about 30 seconds when the image is recorded.

However, with a facsimile apparatus where recording paper discharged after recording onto a predetermined tray are stacked one after another, each recording paper is discharged and stacked onto previously discharged recording papers on the tray in about 15 seconds with a facsimile machine operating with the so-called G3 procedure.

Therefore, it is difficult to assemble an ink jet printer of the above type in a facsimile apparatus.

SUMMARY OF THE INVENTION

The present invention is to provide an image communication.

The prevent invention has been intended in the light of the above, and its object is to provide an improved video image communication apparatus.

Another object of the invention is to provide an image communication apparatus, with which it is possible to prevent deterioration of image due to defective fixing of ink and also prevent contamination of recording paper after recording.

A further object of the invention is to provide an image communication apparatus, in which recording medium after recording can be discharged after ink has been fixed on the previous recording medium.

A still further object of the invention is to provide an image communication apparatus, in which a signal for sending a signal prior to reception of next image data from the image data transmission side is provided after lapse of a predetermined period of time since the end of recording.

The above and other objects will be apparent from the drawings and following description.

BRIEF DESCRIPTION OF THE DRAWINGS

FIG. 5 is a flow chart showing an example of operation of the same embodiment.

DETAILED DESCRIPTION OF THE PREFERRED EMBODIMENTS

Now, an embodiment of the invention will be described in detail with reference to the drawings.

Construction of Recording System (or Printer)

Figure 1:
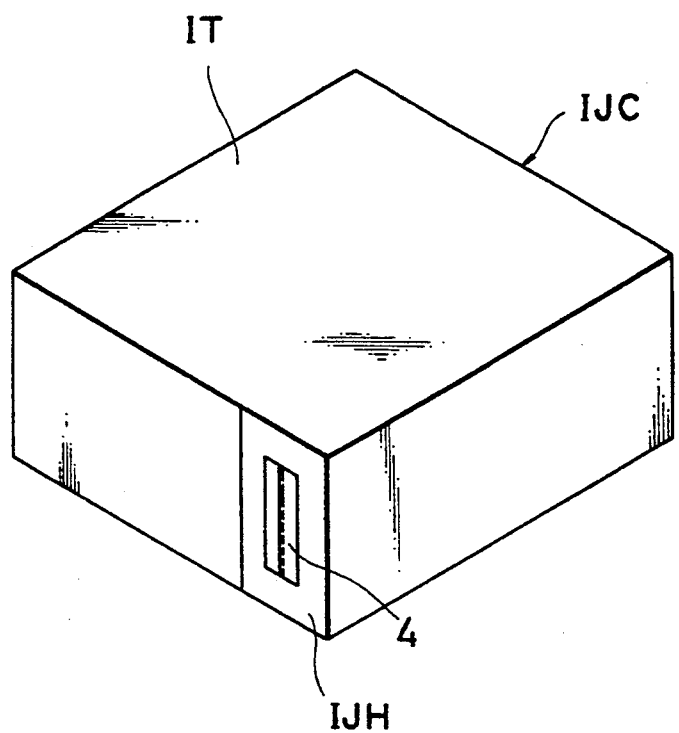
FIG. 1 is a perspective view showing an ink jet cartridge capable of incorporation of the invention.

FIG. 1 shows an example of ink jet recording unit suitable as recording system of a facsimile apparatus incorporating the invention. Referring to the Figure, designated at IJH is an ink jet head (or recording head) of a type utilizing heat energy to cause ejection of ink, and at IJC is an ink jet cartridge integral with ink jet head IJH and provided with ink tank IT for supplying ink thereto. Ink jet cartridge IJC can be mounted.

In ink the jet cartridge IJC of this embodiment, ink jet head IJH has an end slightly projecting from the front end face of ink tank IT. This ink jet cartridge is of a disposable type capable of being mounted on and secured to and dismounted from a carraige provided in a facsimile apparatus body to be described later.

Ink tank IT, in which ink is stored to be supplied to ink jet head IJH, comprises an ink absorbing member, a container, into which the ink absorbing member is inserted, and a lid member for sealing the container (none of these members being shown). Ink tank IT is filled with ink, which is supplied to the ink jet head according to ink ejection.

In this embodiment, ceiling plate 4 is made of an excellently ink-resistant resin such as polysulfon, polyether sulfon, polyphenylene oxide and polypropyrene.

Ink jet cartridge IJC having the above construction is detachably mounted in a predetermined way on a carriage of facsimile apparatus as will be described later, and it forms a desired recorded image on recording medium with relative movement of the carriage and recording medium caused according to provision of predetermined recording signal.

Figure 2:
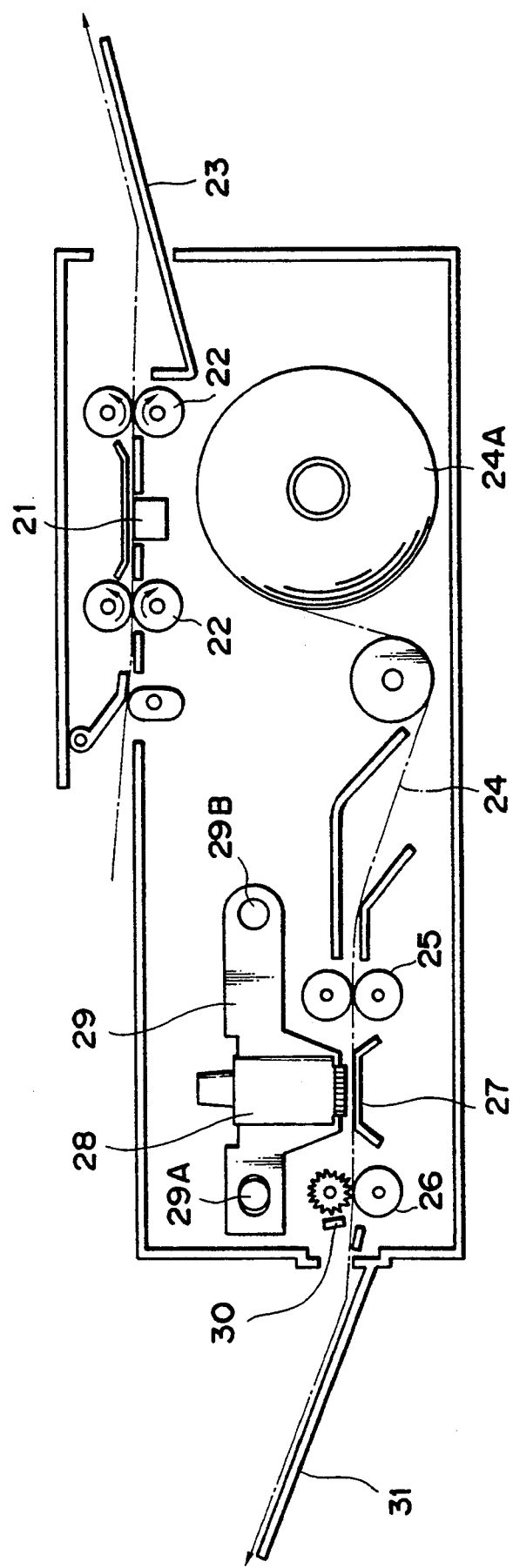
FIG. 2 is a sectional view showing the construction of an embodiment of the invention.

FIG. 2 is a sectional view showing the mechanical construction of a facsimile apparatus as an embodiment of the invention. Designated at 21 is an image sensor of close contact type. The image sensor reads an original fed by feed rollers 22 to a predetermined position and converts the read-out image of original into electric signal. The electric signal thus obtained is processed in a manner as will be described later before it is transmitted. Designated at 23 is an original tray.

Designated at 24A is a recording paper roller with recording paper wound thereon. Recording paper 24 which is paid off roll 24A is fed by feed rollers 25 and 26 to a position on platen 27, i.e., a recording position.

Designated at 28 is an ink jet head (or recording head) of ink jet head cartridge IJC. The head has a nozzle group facing the recording surface of recording paper 24 fed onto platen 27 for ink ejection. Designated at 29 is a head carriage HC carrying recording head 28. The head carriage HC is slidable along two parallel guide shafts 29A and 29B by a drive force transmitted from a driving motor (not shown) via a belt (not shown). Thus, it can reciprocate over the entire width of recording paper 24 so recording head 28 can form an image corresponding to received image data on recording paper 24 with ink ejected from recording head 28.

A head restoration unit (not shown) is disposed on the path of movement of recording head 28 at one end of the path, for instance an end corresponding to a home position of the head. Capping of head 28 is effected by driving the head restoration unit. An operation of restoring the ejection of ink from the head, such as removal of increased viscosity ink inside orifices, is performed by causing forced discharging of ink from the orifices in relation to capping of recording head 28 with a cap section of the head restoration unit. This is effected through ink absorption by suitable ink absorbing means (i.e., an absorbing pump) provided in the head restoration unit (this process being referred to as absorption restoration) or through forcing of ink by suitable forcing means provided in an ink supply path leading to recording head 28 (this process being referred to as forcing restoration). Capping is executed at the end of recording for protecting the recording head.

Designated at 30 is a paper cutter, which effects cutting to a length corresponding to one page of recording paper 24 discharged after recording of received data of one page on discharging tray 31.

Construction of Control System

Figure 3:
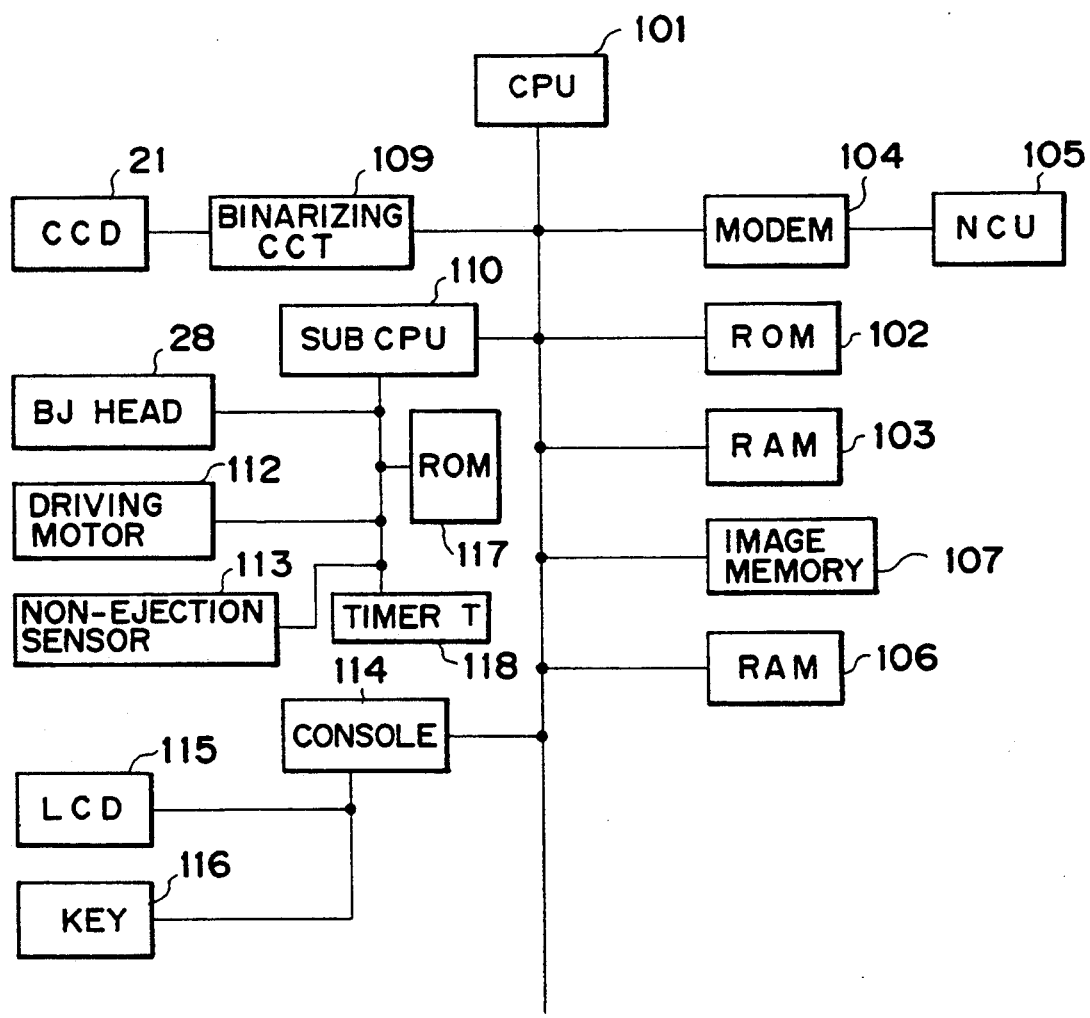
FIG. 3 is a block diagram showing electrical construction of the same embodiment.

FIG. 3 shows the circuit construction of the facsimile apparatus as embodiment of the invention. Referring to the Figure, designated at 101 is a main CPU (i.e., central processing unit) consisting of a microcomputer or the like for controlling the whole apparatus for data transmission and reception through buses. Designated at 102 is a ROM (i.e., read only memory) for storing control procedures (or programs) and so forth, and at 103 is a working RAM (i.e., random access memory) including counters and resistors used by a sub CPU to be described later for operation. Designated at 104 is a MODEM serving as modulation/demodulation unit for data transmission, at 105 a NCU (i.e., net control unit) connected to MODEM 104, which is thus connected through NCU 105 to telephone service line, at 106 is a RAM used for registering telephone numbers, abbreviations, etc., and at 107 is a RAM (or DRAM) for temporarily storing image data.

Designated at 21 is an image sensor of close contact type (for instance a CCD) serving as image sensor means of original reading system The image sensor converts original image, which is focused through a focusing lens such as a rod lens, into electric signal. Designated at 109 is a binarizing circuit for binarizing the output signal of CCD 21.

Designated at 110 is a sub CPU for controlling recording system bubble jet head (BJ head) 28, head carriage driving motor 112 and defective ink ejection sensor 113, at 117 is a ROM, in which a control program as shown in FIG. 5 is stored, and at 118 a timer.

Designated at 114 is an operating unit including a key board and also an operation panel provided with a liquid crystal display (LCD) 115 and various keys 116.

Control operation of this embodiment in connection with the discharging of recording paper during image reception in a G3 (i.e., general) mode will be described with reference to FIGS. 4 and 5.

Figure 4:
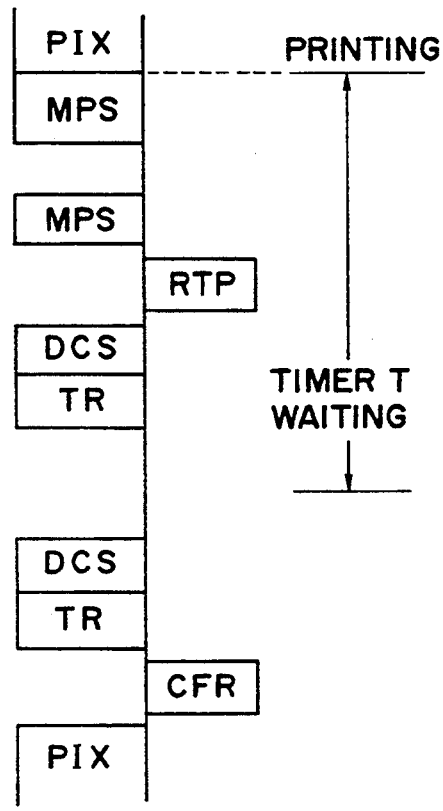
FIG. 4 is a view showing part of a G3 (or general) procedure in the same embodiment.

FIG. 4 shows operation of G3 (or general) procedure from an instant of end of recording (or printing) of one page of image data till reception of the next page of image data. FIG. 5 is a flow chart illustrating this operation.

Referring to FIG. 5, when recording of one page of received image data (PIX in FIG. 4) is ended (step S1), the timer T is set to N (which corresponds to 30 seconds, for instance), and also received signal number counter Q is set to 0 (step S2). Then, whether the count of timer T is 0 is checked (step S3). If the count is not 0, the procedure goes to step S4 of check as to whether MPS signal from the transmitting side has been received. If the signal (i.e., first MPS signal in FIG. 4) has been received, the procedure goes to step S5 of incrementing counter Q by +1. Then in step S6 a check is executed as to whether the count of counter Q is 2. If the count is not 2 (which corresponds to be after reception of the first MPS signal in FIG. 4), the procedure goes back to step S3. In the example of FIG. 4, the procedure goes through steps S3, S4 (reception of the second MPS signal) and S5 and then back to step S6. If it is found in this last step that Q=2, then the procedure goes to step S7. If it is found in step S3 that T=0, the procedure goes to step S8 of receiving the next page of image data (PIX) in normal procedure.

In step S7, the count of counter Q is initialized to 0, then in step S9 RTP signal is sent to the transmitting side, and the procedure goes to step S10. In step S10, whether the count of timer T is 0 is checked. If the count is not 0, whether DCS signal has been received from the transmitting side is checked. If the signal (i.e., the first DCS signal in FIG. 4) has been received, the procedure goes to step S12 of incrementing the count of counter Q by +1 and then to step S13 of check as to whether Q=2. If Q=2 is negated (i.e., after reception of the first DPS signal in FIG. 4), the procedure goes back to step S10. If the count of timer T becomes 0 during this time, the procedure goes to step S14 of receiving the next page of image data (PIX) in normal procedure. In the example of FIG. 4, the procedure goes through steps S10, S11 (reception of the second DCS signal) and S12 and then back to step S13 again. Since Q=2 at this time, the procedure goes to step S14 of sending out CFR signal to the transmitting side in normal procedure before receiving the next page of image data (PIX). Subsequently, the received image data is recorded on recording paper with ink ejection from the recording head, and recording paper is then discharged onto the discharging tray.

It will be appreciated that recording of the next page of image data on recording paper is not effected before lapse of a predetermined period of time (for instance 30 seconds) which is necessary for fixing of ink ejected onto recording paper from the ink jet head as noted above.

The invention is applicable to facsimile apparatuses using as recording system an ink jet recording apparatus of various ink jet recording systems, for instance a commonly termed piezoelectric system using piezoelectric elements as source of ink ejection energy, and particularly excellent effects can be obtained when the invention is applied to recording heads and recording apparatuses of a system, in which ink is ejected from orifices according to changes in the state of ink produced with heat energy.

Typical construction and principle of such recording heads and apparatuses are suitably based on principles disclosed in U.S. Pat. Nos. 4,723,129 and 4,740,796. This system is of either commonly termed on-demand type or continuous type. Particularly, it may be effectively the non-demand type for the following reason. In this type of system, electricity-heat transducers which are disposed in correspondence to ink sheet or ink path retaining ink, are applied with at least one drive signal corresponding to recording data and providing for quick temperature rise to exceed nucleate boiling, thus causing generation of heat energy in the electricity-heat transducers to cause film boiling on the heat-affected surface of the recording head. In consequence, bubbles are formed in ink in one-to-one correspondence to the drive signal. In correspondence to growth and shrinkage of these bubbles liquid (i.e., ink) is ejected through orifices to form at least one ink drop. By providing pulse signal as drive signal, the growth and shrinkage of bubbles are effected instantaneously and adequately. Doing so is more suitable in that ejection of liquid (i.e., ink) which is excellent in responce character can be attained. Such pulse drive signal is suitably those disclosed in U.S. Pat. Nos. 4,463,359 and 4,345,262. By adopting conditions concerning the rate of temperature rise of the heat-affected surface noted above as disclosed in U.S. Pat. No. 4,313,124, further excellent recording can be obtained.

As for the construction of the recording head according to the invention, in addition to the combination structure including orifices, ink paths and electricity-heat transducers (either of straight or orthogonal ink paths) as shown above, there is also a structure as disclosed in U.S. Pat. Nos. 4,558,333 and 4,459,600, in which heat-affected sections are disposed in curved areas. Further, the effects of the invention are obtainable with recording heads such as those disclosed in Japanese Patent Laid-Open No. 59-123670, disclosing a structure in which a slit common to a plurality of electricity-heat transducers serves as an orifice section thereof, and also in Japanese Patent Laid-Open No. 59-138461, disclosing a structure, in which an opening for absorbing a pressure wave of heat energy faces an orifice section. These structures permit reliable and efficient recording to be obtained irrespective of the form of recording head.

Further, the invention is effectively applicable to a recording head of full line type, having a length corresponding to the maximum width of recording medium capable of recording by recording apparatus. Such recording head may have either a structure, which meets the length with a combination of a plurality of recording heads, or a structure as a single integral recording head. Furthermore, the invention is effectively applicable in cases using a recording head of the serial type as noted above inasmuch as the head is of replaceable chip type, which permits electric connection to the apparatus body and supply of ink therefrom when it is mounted on the apparatus body, or of a cartridge type provided integrally on a cartridge.

Further, for more stably obtaining the effects of the invention it is suitable to add restoring means and preliminary auxiliary means which are provided to recording head as elements of recording head. Specific examples of these means provided for the recording head are capping means, cleaning means, pressurizing or withdrawing means, electricity-heat transducers or separate heating elements or combination of these transducers and elements, and means for providing a preliminary ejection mode separately from recording. These means are effective for obtaining stable recording.

Still further, it is possible to provide a plurality of recording heads of the same kind or different kinds for respective different kinds of ink different in recording color and/or concentration in addition to a case of providing only a single recording head for mono-color ink.

I claim:

1. An image communication apparatus for recording an image using a recording head capable of ejecting ink utilizing energy generated from ejection energy generating elements, the apparatus comprising:

communication means for communicating with another image communication apparatus to receive image data therefrom;

driving means for driving said recording head to eject ink onto a recording medium in accordance with the image data received by said communication means;

timer means for counting a predetermined period of time associated with the processing of one page of image data, the predetermined period of time being set in accordance with the amount of time required to fix the ink ejected onto the recording medium; and communication control means for transmitting a signal to the other image communication apparatus, to enable reception of a succeeding page of image data, in accordance with the count of said timer means.

2. The image communication apparatus according to claim 1, wherein said communication control means inhibits transmission to the other image communication apparatus of the signal enabling reception of a succeeding page of image data while said timer means is counting the predetermined period of time, wherein the signal is transmitted to the other image communication apparatus after said timer means completes counting the predetermined time period.

3. The image communication apparatus according to claim 1, wherein said communication control means transmits the signal to the other image communication apparatus when said communication means receives a predetermined procedure signal a predetermined number of times after said timer means begins counting the predetermined time period.

4. The image communication apparatus according to claim 3, wherein the predetermined procedure signal is a signal for selection of a receiving mode and instruction of reception.

5. The image communication apparatus according to one of claims 1 to 4, wherein said ejection energy generating elements generate heat energy and produce a change in the state of the ink to eject ink drops from orifices.

6. The image communication apparatus according to claim 5, wherein the change of state of the ink generates bubbles by film boiling.

* * * * *

UNITED STATES PATENT AND TRADEMARK OFFICE
CERTIFICATE OF CORRECTION

PATENT NO. : 5,251,040
DATED : October 5, 1993
INVENTOR(S) : ATSUSHI SAITO

It is certified that error appears in the above-identified patent and that said Letters Patent is hereby corrected as shown below:

COLUMN 1

Line 39, "first-mentioned" should read --first--.

COLUMN 2

Line 34, "ink the" should read --the ink--.
Line 49, "polypropyrene." should read --polypropylene.--.

COLUMN 4

Line 10, "till" should read --until--.

COLUMN 6

Line 60, "one" should read --any one--

Signed and Sealed this

Third Day of May, 1994

Attest:

BRUCE LEHMAN

Attesting Officer  Commissioner of Patents and Trademarks